United States Patent
Hausman et al.

(10) Patent No.: US 12,114,677 B2
(45) Date of Patent: Oct. 15, 2024

(54) CHOCOLATE CONFECTION

(71) Applicant: MARS, INCORPORATED, McLean, VA (US)

(72) Inventors: David Hausman, Lancaster, PA (US); Shirley Lease, Columbia, PA (US); Barry Glazier, Camp Hill, PA (US)

(73) Assignee: Mars, Incorprated, McLean, VA (US)

( * ) Notice: Subject to any disclaimer, the term of this patent is extended or adjusted under 35 U.S.C. 154(b) by 464 days.

(21) Appl. No.: 17/254,134

(22) PCT Filed: Jul. 2, 2019

(86) PCT No.: PCT/US2019/040263
§ 371 (c)(1),
(2) Date: Dec. 18, 2020

(87) PCT Pub. No.: WO2020/010060
PCT Pub. Date: Jan. 9, 2020

(65) Prior Publication Data
US 2021/0259273 A1    Aug. 26, 2021

Related U.S. Application Data (60) Provisional application No. 62/693,157, filed on Jul. 2, 2018.

(51) Int. Cl.
*A23G 1/48* (2006.01)
*A23G 1/00* (2006.01)
*A23G 1/54* (2006.01)

(52) U.S. Cl.
CPC .............. *A23G 1/48* (2013.01); *A23G 1/005* (2013.01); *A23G 1/54* (2013.01)

(58) Field of Classification Search
CPC ....................................................... A23G 1/48
See application file for complete search history.

(56) References Cited

U.S. PATENT DOCUMENTS

| | | | |
|---|---|---|---|
| 8,623,442 B2 | 1/2014 | Vega | |
| 2008/0317891 A1 | 12/2008 | Anderson | |
| 2011/0177174 A1* | 7/2011 | Crowley | ................. A23L 27/70 |
| | | | 426/631 |

FOREIGN PATENT DOCUMENTS

EP    1346640 B1    9/2003

OTHER PUBLICATIONS

Skelhon et al., "Quiescent water in oil Pickering emulsions as a route toward healthier fruit juice infused chocolate confectionery". J Mater. Chem, 2012, 22, 19289. pp. 1-7. (Year: 2012).*
Nieburg, "Slash chocolate fat in half and prevent bloom with fruit juice". Available Aug. 12, 2012, from https://www.confectionerynews.com. pp. 1-3. (Year: 2012).*
Brunning, https://www.compoundchem.com. pp. 1-5. (Year: 2016).*
Astringency Overview from Science Direct, : Ulla, et al., "Genetic basis of flavor sensitivity and food preferences". Flavor, 2016, pp. 2-3. (Year: 2016).*

* cited by examiner

*Primary Examiner* — Jenna A Watts (57) ABSTRACT

The invention relates to a chocolate confection having improved flavor attributes. The chocolate confection comprises a white confectionery ingredient, a cocoa extract, and a food acid.

29 Claims, 5 Drawing Sheets

CHOCOLATE CONFECTION

FIELD OF THE INVENTION

The invention relates to a chocolate confection having enhanced or significantly different flavor attributes. In particular, the invention relates to a chocolate confection having a significantly different flavor and/or texture profile. The chocolate confection comprises a white confectionery ingredient, a cocoa extract, and a food acid.

BACKGROUND OF THE INVENTION

There is a desire among consumers for chocolate confections that have improved organoleptic properties. Each of the five basic senses of taste, sight, smell, touch and hearing are involved in organoleptic appreciation. Companies and consumers have established sensory analyses to understand the various organoleptic properties of foods, including chocolate. Within the chocolate area, these properties include the flavor, the texture, the aroma, the mouthfeel, the color, the surface gloss, and the physical hardness. It is commonly known that chocolates are subjected to sensory analyses, where the flavor and texture profiles are mapped, and often those maps include attributes that classify the flavor, texture, and aroma attributes of chocolate, including, but not limited to, astringent, creamy, fine, coarse, melting, bitter, sour, sweet, floral, spices, fruity, vanilla, caramel, woody, nutty, roasted, chocolate essence, cocoa, and dairy derived attributes, such as, but not limited to, cooked milk, milky, creamy, buttery, and yoghurt like flavors. White chocolate, milk chocolate and dark chocolate each have a set of desirable attributes distinguishing them from each other. For example, flavor attributes desirable in white chocolate may include, but not limited to, vanilla, dairy derived, cocoa, and floral. As another example, flavor attributes typically desirable in dark chocolate may include, but not limited to, fruity, chocolate essence, earthy, and woody.

There are a number of challenges in producing chocolate confections that have improved desirable organoleptic properties. A variety of factors impact organoleptic properties of chocolate confections including, among other things, cocoa bean and nib type and processing, quality and flavor of chocolate raw materials, blending parameters, processing temperatures and timings, and storage conditions. Off-flavors, odors and colors may result when the various factors negatively impact the chocolate confection. Off-flavors and odors are not necessarily foul and bad tasting flavors and aromas, but instead flavors and aromas that are undesirable or different from the expected attributes. Additionally, off-flavors tend to decrease the overall flavor quality because these off-flavor attributes may detract and/or mask the desirable flavor attributes. In some scenarios, flavor attributes such as bitterness, astringency, and sourness may have this effect. For example, modifying the flavor attributes of a white confectionery ingredient presents various challenges, such as, but not limited to the, maintaining the balance of desirable flavor attributes, reducing susceptibility to oxidation, and counteracting disposition towards off-flavors and odors which may detract and mask the desirable flavor attributes. Accordingly, it is well known that enhancing the organoleptic properties of a chocolate confection comprising a white confectionery ingredient presents a challenge. It is thus desirable to provide chocolate confections with enhanced flavor attributes wherein there is no or little detriment to the organoleptic properties of the chocolate confection. In particular, there is a need to provide a differentiated and desirable flavor profile for a chocolate confection comprising a white confectionery ingredient.

SUMMARY OF THE INVENTION

There remains a need for chocolate confections with enhanced flavor attributes. The present invention is direct to a chocolate confection having enhanced or modified fruity flavor attributes and modified dairy derived flavor attributes. More particularly, there is provided a chocolate confection comprising a white confectionery ingredient, a cocoa extract, and a food acid. The combination of the type, amount, and particle size of the cocoa extract and the type, amount, and particle size of the food acid in the chocolate confection enhances or modifies the fruity flavor attributes and modifies the dairy derived flavor attributes of the white confectionery ingredient to provide a chocolate confection with unique organoleptic properties, including enhanced or modified flavor attributes. Surprisingly, the inventors have found that the chocolate confections of the present invention exhibit a significantly differentiated flavor profile from conventional chocolate confections.

The present invention is also directed to a chocolate confection comprising a white confectionery ingredient between about 0.1% to 20% by weight of a cocoa extract, or preferably about 5% or less by weight of a cocoa extract, and between about 0.1% to 10% by weight of a food acid or preferably about 1% or less by weight of a food acid, and in particular, the cocoa extract has a mean particle size of between about 1 to 50 microns or preferably less than about 30 microns. Additionally, the present invention is directed to a chocolate confection comprising a white confectionery ingredient which includes white chocolate, white compound coating, or combinations thereof. As discussed in detail, the phrase "white chocolate" means a white chocolate conforming to the applicable country-based standard of identity.

It is known in the art that the use of cocoa extract particles may render the chocolate confection astringent and/or bitter. Surprisingly and contrary to what one would expect, the chocolate confection of the present invention having desirable and unique flavor attributes may be prepared using a cocoa extract with a mean particle size of between about 1 to 50 microns or preferably less than about 30 microns. Surprisingly and contrary to what one would expect, when the cocoa extract is reduced to particle sizes of between about 1 to 50 microns or preferably less than about 30 microns, a minimal impact on bitterness and astringency is observed in the chocolate confection of the present invention.

Accordingly, in the present invention, the cocoa extract has a mean particle size of preferably less than about 30 microns. Other embodiments include cocoa extract that has a mean particle size of less than about 20 microns. In some embodiments of the invention, the cocoa extract has a mean particle size of less than about 15 microns. Additionally, in other embodiments, the cocoa extract has a mean particle size of less than about 12 microns. Other embodiments include a cocoa extract that has a mean particle size of less than about 10 microns. Furthermore, some embodiments include a cocoa extract that has a mean particle size of less than about 5 microns.

In other embodiments, the inclusion of between about 0.1% to 20% by weight of a cocoa extract, or preferably of about 5% or less by weight of the cocoa extract also enhances the fruity flavor attributes and modifies the dairy derived flavor attributes, and has a minimal impact on the undesirable flavor attributes of bitterness and astringency. In some embodiments of the invention, the chocolate confection has about 3% or less by weight of the cocoa extract based on weight of the chocolate confection. In some embodiments, the chocolate confection has about 1.5% or less by weight of the cocoa extract based on weight of the chocolate confection. In other embodiments, the chocolate confection has about 0.5% or less by weight of the cocoa extract based on weight of the chocolate confection.

In some embodiments of the invention, suitable food acids may include any acid suitable for human consumption including, but not limited to, acetic acid, adipic acid, ascorbic acid, citric acid, fumaric acid, lactic acid, sorbic acid, tartaric acid, phosphoric acid, acid compositions derived from fruit juices or extracts or concentrates, sodium acid phosphate, sodium acid sulfate, gluconic acid, glucono-delta-lactone, or combinations thereof.

In an embodiment of the invention, the inclusion of between about 0.1% to 10% by weight of a food acid or preferably of about 1% or less by weight of the food acid based on the weight of the chocolate confection, in some instances, enhances the desirable flavor attributes, including fruity flavor attributes. In other embodiments of the invention, the chocolate confection has about 0.75% or less by weight of the food acid based on weight of the chocolate confection. The present invention also includes a chocolate confection with about 0.5% or less by weight of the food acid based on weight of the chocolate confection. Other embodiments include about 0.4% or less by weight of the food acid based on weight of the chocolate confection. Regarding particle size, in some embodiments, the acid has a mean particle size of between about 10 to 500 microns, preferably less than about 400 microns. In other instances, the food acid has a mean particle size of less than about 375 microns. In another embodiment, the food acid has a mean particle size of less than about 375 to 300 microns. In some embodiments, the food acid has a mean particle size of less than about 30 microns. In an embodiment, the food acid has a mean particle size of less than about 20 microns. Other embodiments include a food acid having mean particle size of less than about 15 microns. In other instances, the food acid has a mean particle size of less than about 12 microns.

The combination of the type, amount, and particle size of the cocoa extract and the type, amount, and particle size of the food acid in the chocolate confection provides a chocolate confection with a significantly differentiated flavor profile. Furthermore the combination of the type, amount and particle size of the cocoa extract and the type, amount and particle size of the food acid in the chocolate confection enhances the fruity flavor attributes and modifies the dairy derived flavor attributes of the white confectionery ingredient to provide a chocolate confection with unique organoleptic properties, including enhanced flavor attributes. The enhancement of these attributes does not negatively impact the organoleptic properties of the chocolate confections of the present invention. Furthermore, the enhancement of these attributes does not negatively impact processability as the chocolate confections remain processable using standard equipment and techniques.

Of interest is the fruity flavor attribute of dark chocolate, which may include, but is not limited to, the presence or absence of citrus, berries, tropical and yellow fruits, mango, banana, apple, peach, dried fruits, as figs and prunes, among other fruity flavor attributes.

In an embodiment of the present invention is a chocolate confection with intense fruity flavor attributes. In some embodiments of the present invention is a chocolate confection with enhanced fruity flavor attributes. In a further embodiment of the present invention is a chocolate confection with significantly different flavor attributes than conventional chocolate confections. In particular, the chocolate confections of the present invention have significantly different key flavor attributes to conventional chocolate confections. In some embodiments of the invention, the chocolate confection may have statistically significantly more intense fruity flavor attributes, at 95% confidence. In a further embodiment of the invention, the chocolate confection may have statistically significantly more intense fruity flavor attributes at 95% confidence compared to white chocolate and/or milk chocolate. Statistical significance is determined using P-value based on Analysis of Variance (ANOVA), using least significant difference (LSD) $P<0.05$ (95%).

In some instances, the dairy derived flavor attributes of milk chocolate are of particular interest and may include, but are not limited to, the presence or absence milky, creamy, buttery, and yoghurt like flavors. In some embodiments of the present invention are a chocolate confection with modified dairy derived flavor attributes. Accordingly, in some embodiments, the chocolate confection may have statistically significantly less intense dairy derived flavor attributes, at 95% confidence. Statistical significance is determined using P-value based on ANOVA, using LSD of $P<0.05$ (95%).

As a secondary benefit to the flavor attributes, the cocoa extract of the present invention produces a chocolate confection with a desirable red color or hue. In some embodiments of the invention, the Hunter $L*a*b*$ scale provides color coordinates to specify the color of the chocolate confection. In some embodiments, the chocolate confection may have a Hunter $L*$ value in the range of about 15 to about 70. In other instances, the chocolate confection may have a Hunter $L*$ value in the range of about 16 to about 30. In some embodiments, the chocolate confection may have a Hunter $L*$ value in the range of about 40 to about 58. In other embodiments, the chocolate confection may have a Hunter $L*$ value in the range of about 50 to about 70.

In some embodiments, the chocolate confection may have a Hunter $a*$ value in the range of about 1 to about 40. In other instances, the chocolate confection may have a Hunter $a*$ value in the range of about 2 to about 13. In an embodiment, the chocolate confection may have a Hunter $a*$ value in the range of about 4 to about 28. In other embodiments, the chocolate confection may have a Hunter $a*$ value in the range of about 11 to about 16.

In some embodiments, the chocolate confection may have a Hunter $b*$ value in the range of about 0.5 to about 20. In other instances, the chocolate confection may have a Hunter $b*$ value in the range of about 3 to about 5. In an embodiment, the chocolate confection may have a Hunter $b*$ value in the range of about 5 to about 17. In other embodiments, the chocolate confection may have a Hunter $b*$ value in the range of about 5 to about 12.

BRIEF DESCRIPTION OF THE DRAWING

Various aspects, objects, and embodiments of the invention are schematically represented in the exemplary drawing and flow chart, which in no way should be taken as a limitation on the scope or extent of the invention.

DETAILED DESCRIPTION OF THE INVENTION

The present specification provides certain definitions and methods to better define the present invention and to guide those of ordinary skill in the art in the practice of the present invention. Provision, or lack of the provision, of a definition for a particular term or phrase is not meant to imply any particular importance, or lack thereof. Rather, and unless otherwise noted, terms are to be understood according to conventional usage by those of ordinary skill in the relevant art.

The terms "a" and "an" do not denote a limitation of quantity, but rather denote the presence of at least one of the referenced items.

If ranges are disclosed, the endpoints of all ranges directed to the same component or property are inclusive and independently combinable (e.g., ranges of "up to 25 wt. %, or, more specifically, 5 wt. % to 20 wt. %," is inclusive of the endpoints and all intermediate values of the ranges of "5 wt. % to 25 wt. %," etc.).

As used herein, the phrase "confectionery" is interchangeable with "confection".

As used herein, the phrase "food acid" is interchangeable with "acid".

As used herein, the phrase "white confectionery ingredient" includes white chocolate, white compound coating, or combinations thereof. As used herein, the phrase "white chocolate" means a white chocolate conforming to the applicable country-based standard of identity. On the other hand, the phrase "white compound coating" means a white compound coating that does not conform to the applicable country-based standard of identity for "white chocolate". The phrase "white compound coating" is used interchangeably with "white compound chocolate". For example, in both the United States and Europe, an excerpt from the "white chocolate" standard of identity includes that the chocolate, at least, does not have less than 20% by weight of cocoa butter. Correspondingly, in the United States and Europe, a "white compound coating" includes a composition that has, at least, less than 20% by weight of cocoa butter.

As used herein, "enhanced shelf life" is interchangeable with "enhanced shelf stability". The phrases "enhanced shelf life" and "enhanced shelf stability" mean that the chocolate confection of the present invention has statistically significant changes in the organoleptic attributes, including, but not limited to, flavor attributes, over an extended period of time over 6 weeks, 12 weeks, 26 weeks, 30 weeks, 34 weeks, or more. For example, in some embodiments of the invention, the chocolate confection may have statistically significantly more intense fruity flavor attributes, at 95% confidence, and may have enhanced shelf life. In another example, in some embodiments of the invention, the chocolate confection may have statistically significantly less dairy derived flavor attributes, at 95% confidence, and may have enhanced shelf stability.

As used herein, the terms "red color", "pink color", and "purple color" include all variations in hue, lightness and saturation, of "red", "pink" and "purple" colors, including for example, but not limited to, red, pink, purple, mauve, violet, and parme.

The phrases "first portion of the white confectionery ingredient", "second portion of the white confectionery ingredient", "third portion of the white confectionery ingredient", and the like, as used herein, do not denote any order, or importance, but rather are used to distinguish one quantity of the white confectionery ingredient from other quantities.

The present invention provides a chocolate confection with enhanced flavor attributes. In another aspect, the present invention provides a chocolate confection with significantly different flavor profile compared to standard white, milk or dark chocolate confections. More particularly, there is provided a chocolate confection comprising a white confectionery ingredient, a cocoa extract, and a food acid. The present invention is also directed to a chocolate confection with a cocoa extract that has a mean particle size preferably of about less than 30 microns. Oftentimes, the inclusion of cocoa extract may render the chocolate confection astringent and/or bitter. Surprisingly and contrary to what one would expect, when the cocoa extract is reduced to a certain particle size, less impact on bitterness and astringency is observed in the chocolate confection of the present invention. The combination of the type, amount, and particle size of the cocoa extract and food acid in the chocolate confection enhances the fruity flavor attributes and modifies the dairy derived flavor attributes of the white confectionery ingredient to provide a chocolate confection with unique organoleptic properties, including, enhanced flavor attributes. In a further embodiment, the combination of the type, amount and particle size of the cocoa extract and food acid in the chocolate composition of the present invention provides a product having significantly different flavor attributes from the standard white, milk or dark chocolate confections.

There is an increasing desire among consumers for chocolate confections that have specific organoleptic properties. Each of the five basic senses of taste, sight, smell, touch and hearing are involved in organoleptic appreciation. Sensory analyses have been established to understand the various organoleptic properties of chocolate. The flavor profiles of a chocolate confection may be measured using sensory attributes such as those involving taste and texture. The Spectrum™ method of descriptive analysis is described in MORTEN MEILGAARD, D. Sc. ET AL., SENSORY EVALUATION TECHNIQUES (3d ed. 1999), which is incorporated herein by reference. The Spectrum™ method employs intensity scales to capture intensity differences, and these intensity scales are anchored to a set of references. The use of standardized references allows for analyses that is universally reliably and reproducibly measurable. Additionally, this ability to reproduce the results at another time and with another highly trained panel may make the data more valuable than other analytical techniques. In one aspect, sensory analyses according to the conventionally understood Spectrum Methodology using a Descriptive Analysis evaluation are employed. The chocolate confections of the present invention in a further aspect are subjected to a standard Descriptive Analysis evaluation using independent external, highly trained panelists. Panelists in such Descriptive Analysis evaluations usually undergo rigorous training, for example 6 to 9 months of training to understand attribute definitions. The Descriptive Analysis evaluation is typically used to decipher how products differ and the magnitude of those differences. Typical attributes that may be evaluated under this test include but are not limited to the following flavor attributes: Chocolate essence, dark roast, alkali, dairy complex, cooked milk, nonfat dried milk, vanilla, vanillin, caramel essence, fruity complex, red fruit, citrus, woody, nutty, cultured dairy.

Typical basic tastes attributes evaluated under this test include but not limited to sweet, sour, salt, bitter and astringent. In another aspect, further sensory evaluations using known methods may also be employed for example conventionally known discrimination methodology a sensory analysis technique usually used to determine whether or not there is a detectable difference between two or more products holistically. Panelists used for this type of sensory testing are usually screened for their ability to tell differences in a range of different products and magnitudes of differences. Typically in this Degree of Difference methodology, panelists are provided with a known control and then given samples which are identified only as 3 digit codes. The panelists indicate how different they perceive the test products to be from the known control using a 7 point scale. Typically where products have included colour differences, panelists were blindfolded in order to limit the assessment to flavor and/or texture. The products are typically matured to for example 4 weeks of age at the time of testing.

For Chocolate, sensory analyses have been established to understand the various organoleptic properties, including the flavor, the aroma, the mouthfeel, the color, the surface gloss, and the physical hardness of chocolate. It is commonly known that chocolates are subjected to sensory analyses, where the flavor and textures profiles are mapped, and often those maps include attributes that classify the flavor, texture, and aroma attributes of chocolate, including, but not limited to, astringent, creamy, fine, coarse, melting, bitter, sour, sweet, floral, spices, fruity, vanilla, caramel, nutty, roasted, chocolate essence, cocoa, and dairy derived attributes, such as, but not limited to, milky, creamy, buttery, and yoghurt like flavors.

White confectionery ingredients, which include, but not limited to, white chocolate, have a balanced set of desirable flavor attributes. In particular, common desirable attributes may include, but are not limited to, the following: dairy derived attributes (such as, but not limited to, milky, creamy, buttery, and yoghurt like flavors), vanilla, moderate sweetness, creamy, smooth, fresh, floral, chocolate essence, cocoa flavor and aroma, complexity and ease of processability. Conversely, common undesirable attributes of white chocolate and white confectionery ingredients may include, but not limited to, the following: chalky, waxy, too sweet, residual oily film, chemical flavor, synthetic flavors, grainy texture, other off-flavors, and odors from surroundings.

Furthermore, in evaluating dark chocolate, common desirable attributes may include the following: fruity, earthy, woody, bitter, tannic, chocolate essence, cocoa, texturized, rich, complex, intense, creamy, and ease of processability. Conversely, common undesirable attributes of dark chocolate may include, but not limited to, the following: overly sweet, overly bitter, brittle texture, and off-flavors and odors from surroundings.

Additionally, in evaluating milk chocolate, common desirable attributes may include the following: dairy derived attributes (such as, but not limited to, milky, creamy, buttery, and yoghurt like flavors), honey, vanilla, caramel, chocolate essence, cocoa, creamy, and ease of processability. Conversely, common undesirable attributes of milk chocolate may include, but not limited to, the following: overly sweet, oily, chemical flavors, synthetic flavors, grainy texture, and off-flavors and odors from surroundings.

The invention of the present invention is a chocolate confection with enhanced or modified flavor attributes, including, fruity flavor attributes and dairy derived flavor attributes. In some embodiments of the present invention, the chocolate confection exhibits a balance of flavors representative of key flavor attributes of white, milk and dark chocolates. In further embodiments of the present invention, the chocolate confection exhibits significantly differentiated flavor attributes. In particular, the chocolate confection of the present invention exhibits a significantly differentiated or unique flavor profile compared to standard white, milk or dark chocolate.

Of particular interest, is the fruity flavor attribute of some dark chocolates, which may include, but is not limited to, the presence or absence of citrus, berries, tropical and yellow fruits, mango, banana, apple, peach, dried fruits, figs and prunes, among other flavor attributes. Chart A shown in FIG. 2 displays some of the ways in which some white chocolates differ from some milk chocolates in the intensity of the fruity flavor attributes as compared to some dark chocolates. For example, the fruity flavor attributes of some dark chocolates are higher in intensity than the fruity flavor attributes of some white chocolates.

In an embodiment of the present invention is a chocolate confection with intense fruity flavor attributes. In some embodiments of the present invention is a chocolate confection with enhanced fruity flavor attributes. In another embodiment is a chocolate confection according to the present invention with a significantly different fruity flavor attribute when compared to conventional white or milk chocolate confections. Accordingly, in some embodiments of the invention, the chocolate confection may have statically significantly more intense fruity flavor attributes, at 95% confidence. Statistical significance is determined using P-value based on Analysis of Variance (ANOVA), using least significant difference (LSD) P<0.05 (95%). It is believed that the fruity flavor attributes drive the overall flavor differences in the chocolate confection based on a Spectrum trained descriptive panel as aforementioned and described in the present invention. A sensory panel was conducted with the results displayed in Chart B shown in FIG. 3 providing the intensities of the fruity flavor attributes of the exemplary chocolate confections in Examples A, B and C, as compared to some dark, milk, and white chocolates. Chocolate confections of the present invention in particular products produced according to the examples A, B, C show higher intensity of fruity flavour attribute when compared with standard milk or white chocolate confections. Furthermore, said products show advantageously comparable fruity flavour attribute to standard dark chocolate confections. In particular, such products of the present invention with modified flavour profiles have little or no detrimental impact on the organoleptic properties of the said chocolate confection.

Figure 4:
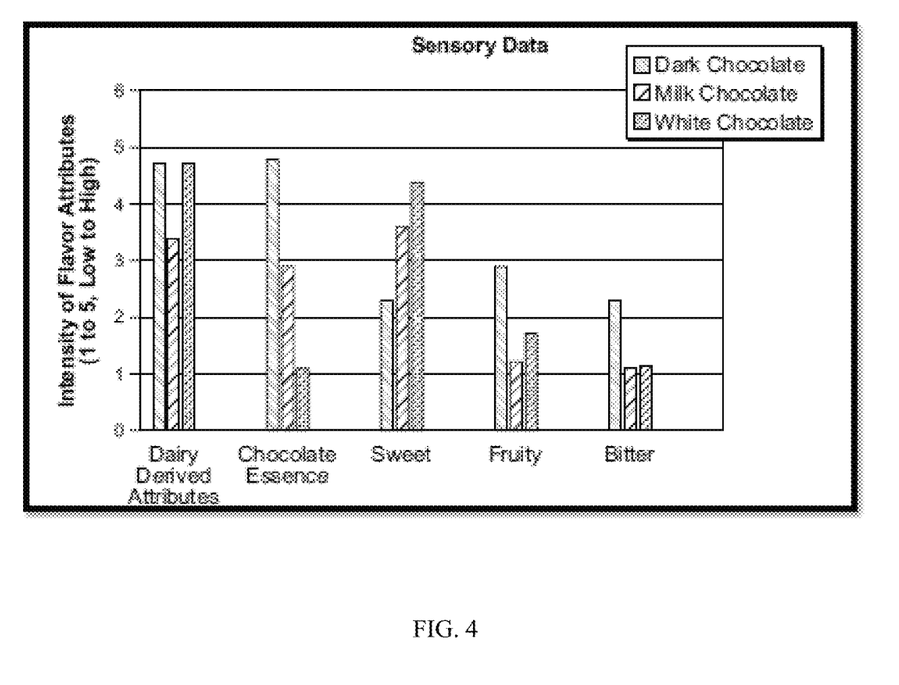
FIG. 4 shows a Chart C which illustrates Intensity of Dairy Derived Flavour attributes of Dark, Milk, and White chocolate.

In some instances, the dairy derived flavor attributes of milk chocolate are of particular interest and may include, but are not limited to, the presence or absence of milky, creamy, buttery, and yoghurt like flavor attributes. Chart C shown in FIG. 4 displays some of the ways in which some white chocolates differ from some milk chocolates in the intensity of the dairy derived flavor attributes. For example, the dairy derived flavor attributes of some milk chocolates are less than the dairy derived flavor attributes of some white chocolates.

In some embodiments of the present invention is a chocolate confection with modified dairy derived flavor attributes. In an embodiment, the chocolate confection has a less intense dairy derived flavor attributes. In some embodiments of the invention, the chocolate confection may have statistically significantly less intense dairy derived flavor attributes, at 95% confidence. As noted above, to determine statistical significance we use P-value based on ANOVA, using LSD P<0.05 (95%). It is believed that the dairy derived flavor attributes drive the overall flavor differences in the chocolate confection based on a Spectrum trained descriptive panel. A sensory panel was conducted with the results displayed in Chart D shown in FIG. 5 providing the intensities of the dairy derived flavor attributes of the exemplary chocolate confections in Examples A, B and C, as compared to some dark, milk, and white chocolates.

In some embodiments, the chocolate essence flavor attribute of white chocolate is of keen interest and may include the presence or absence of flavors from the cacao derived raw materials. In addition to the increasing desire among consumers for chocolate confections that have enhanced flavor profiles, there is a desire for consumers to have chocolate confections with desirable color profiles. Color is one of the five senses used to evaluate chocolate. If the color of chocolate is unattractive and/or unnatural, it may create an instant disliking by the consumer and may fail to stimulate the flow of digestive juices.

White chocolate, milk chocolate and dark chocolate each have a range of standard colors known in the art. For example, in evaluating white chocolate and white confectionery ingredients, typical colors may include, but are not limited to, ivory, pale yellow, beige, or white color. Additionally, in evaluating dark chocolate, common colors may include, but are not limited to, taupe, dark brown, or chestnut. Furthermore, typical colors of milk chocolate may include, but are not limited to, tan, light brown, brown or sepia.

There is a growing interest for chocolate confections that are outside of the traditional three color categories of chocolate dark, white, and milk. There are a variety of color additives that are suitable for use in chocolate, including synthetic and natural colors. For example, synthetic red colors may be imparted using carmoisine and amaranth, synthetic yellow colors may be imparted using tartrazine and quinolone yellow, among any other additives for any other colors. Natural colors, which may also impart flavor as a primary or secondary mechanism of action, may include, but not limited, to carmine, red berry, red beet, or un- or under-fermented cocoa beans for red, pink and/or purple colors; curcumin, orange zest, turmeric for yellow or orange colors; seaweed and green tea for green colors. Chocolate with a red color creating a new ruby chocolate category, in addition to dark, white, and milk. As discussed above, in an embodiment of the present invention, the cocoa extract enhances the flavor attributes of the white confectionery ingredient in combination with the food acid in the chocolate confection. As a secondary benefit, the cocoa extract of the present invention produces a chocolate confection with a desirable red color, pink color, or purple color.

Various methods have been developed and utilized in the art to measure color properties, such as, reflection, transmission and absorption, to name a few. In particular, it is well known that color is defined with three primary attributes: hue, lightness, and saturation. Hue is known to form the color wheel, which comprises red, yellow, green, and blue, in addition to the entire continuum of hues in between. Lightness is known to identify the brightness of the color, on the spectrum of dark colors to bright colors, and is measured independently of hue. Furthermore, saturation is known to distinguish vivid colors from dull colors, and is measured independently of hue and lightness. Scales for hue, lightness and saturation have been established in the art in order to provide numerical values for color. Additionally, the Pantone Color Formula Guide (Pantone Inc. 590 Commerce Blvd., Carlstadt, N.J. 07072) and the Munsell Color System are both visual color systems which include a series of color charts that may be used for visual comparison. Color meters were developed to obtain numerical values for color and to eliminate the error caused by visual comparison. The Hunter colorimeter is a frequently used tool to obtain numerical color analysis.

The Hunter colorimeter measures color using the L*a*b* scale and provides color coordinates to specify the color of the chocolate confectionery of the present invention. In this system, the color coordinates may be denoted by the characters L*, a* b*, C*, and/or h°. These color coordinates are described more fully in Hunter, R. S., *The Measurement of Appearance*, John Wiley and Sons, New York, 1975. The value of the color coordinates may be determined with an appropriate measuring system. The L*, a*, and b* values of the chocolate confectionery of the present invention may be determined, for example, with a Minolta CHROMA METER CR-300 series with a DP-301 DATA PROCESSOR. It is well known in the art that degree of color difference is calculated using the $\Delta E^*_{ab}$ an equation which is described more fully in the art.

In other embodiments of the invention, the Hunter L*a*b* scale provides color coordinates to specify the color of the chocolate confectionery. In some embodiments, the chocolate confection may have a Hunter L* value in the range of about 15 to about 70. In other instances, the chocolate confection may have a Hunter L* value in the range of about 16 to about 30. In an embodiment, the chocolate confection may have a Hunter L* value in the range of about 40 to about 58. In other embodiments, the chocolate confection may have a Hunter L* value in the range of about 50 to about 70.

In some embodiments, the chocolate confection may have a Hunter a* value in the range of about 1 to about 40. In other instances, the chocolate confection may have a Hunter a* value in the range of about 2 to about 13. In an embodiment, the chocolate confection may have a Hunter a* value in the range of about 4 to about 28. In other embodiments, the chocolate confection may have a Hunter a* value in the range of about 11 to about 16.

In some embodiments, the chocolate confection may have a Hunter b* value in the range of about 0.5 to about 20. In other instances, the chocolate confection may have a Hunter b* value in the range of about 3 to about 5. In an embodiment, the chocolate confection may have a Hunter b* value in the range of about 5 to about 17. In other embodiments, the chocolate confection may have a Hunter b* value in the range of about 5 to about 12.

In some embodiments of the invention, the chocolate confection may have a Pantone number in, including, but not limited to, the range of 7633-C to 7639-C.

White Confectionery Ingredient

The chocolate confection of the present invention comprises a white confectionery ingredient, a cocoa extract, and a food acid with enhanced attributes. Compositions suitable as the white confectionery ingredient include white chocolate, white compound coating, or combinations thereof. As noted above, the phrase "white chocolate" means a white chocolate that conforms to the applicable country-based standard of identity. On the other hand, the phrase "white compound coating" means a white compound coating that does not conform to the applicable country-based standard of identity.

Figure 2:
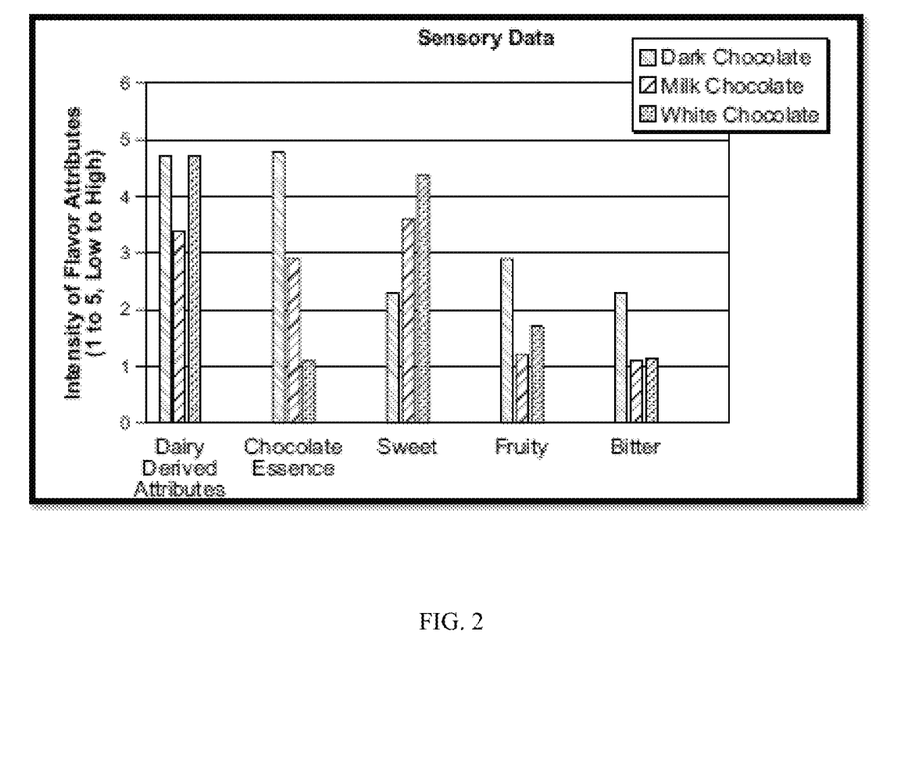
FIG. 2 shows a Chart A which illustrates Intensity of Fruity Flavour attributes of Dark, Milk, and White Chocolate.

White confectionery ingredients, which includes, but not limited to, white chocolates, have a balanced set of desirable flavor attributes. In particular, common desirable attributes may include, but are not limited to, the following: dairy derived attributes (such as, but not limited to, milky, creamy, buttery, and yoghurt like flavor), vanilla, moderate sweetness, creamy, smooth, fresh, floral, chocolate essence, cocoa flavor and aroma, complexity and ease of processability. Conversely, common undesirable attributes of white chocolate and white confectionery ingredients may include, but not limited to, the following: chalky, waxy, too sweet, residual oily film, chemical flavor, synthetic flavors, grainy texture, other off-flavors, and odors from surroundings. As an example, the aforementioned Chart A in the present application displays some of the ways in which some white chocolates differ in flavor profiles from some dark chocolates and some milk chocolates.

It is known to one of ordinary skill in the art that white confectionery ingredients may have undesirable flavor, aroma, and color attributes, and a limited shelf life. One of the factors limiting the shelf life of the white confectionery ingredient, includes, but it not limited to, susceptibility to oxidative rancidity, and thus may degrade into undesirable off-flavors and odors. It is well known that oxidation is one of the mechanisms by which the white confectionery ingredient may result in off-organoleptic attributes due to degradation over a shelf life of over 6 weeks, 12 weeks, 26 weeks, 30 weeks, 34 weeks, or more. Accordingly, researchers have explored the inclusion of antioxidants to attempt to delay the onset of oxidation. Commonly utilized synthetic antioxidants include, but not limited to, butylated hydroxylanisole (BHA), butylated hydroxytoluene (BHT), tert-butylhydroquinone (TBHQ), and propyl gallate (PG). To exclude synthetic additives, natural antioxidants utilized include, but not limited to, tocopherols, lecithin, and ascorbic acid. As explained in the upcoming sections, cocoa extract is known to have antioxidant properties and therefore may function to delay the onset of oxidation that typically negatively impacts the organoleptic attributes, including, but not limited to, flavor attributes, and shelf life of the white confectionery ingredient, and thereby resulting in a chocolate confection with an enhanced shelf life of over 6 weeks, 12 weeks, 26 weeks, 30 weeks, 34 weeks, or more.

In many countries, chocolate and sometimes compound coatings are subject to an established or defined content or standard of identify. Oftentimes, a government entity is responsible for setting these standards or definitions and overseeing their use and compliance. For example, in the United States, chocolate is subject to a Standard of Identity (S.O.I.) established by the U.S. Food and Drug Administration (FDA) under the Federal Food, Drug and Cosmetic Act. Definitions and standards for the various types of chocolates and compound coatings, including white chocolate and white compound coatings, are established in the United States. Similarly, in Europe, the European Union defines and sets standards for cocoa and chocolate products. Other countries, such as Canada, Brazil, and Mexico have established standards for cocoa and chocolate products. On an international level, Codex Alimentarius, also referred to as CODEX, is a collection of internationally adopted food standards, and has issued a standard for chocolate and chocolate products intended for human consumption.

In the United States, an excerpt from the S.O.I for white chocolate includes that it is not less than 20% by weight of cocoa butter, not less than 14% by weight of total milk solids, not less than 3.5% by weight milk of fat, and not more than 55% by weight of nutritive carbohydrate sweetener. Similarly, on an international level, an excerpt from the CODEX chocolate standards for white chocolate includes that it is not less than 20% by weight of cocoa butter, not less than 14% by weight of milk solids, and between 2.5% and 3.5% by weight of milk fat.

In Europe, Canada, Brazil, and Mexico standards have been promulgated for white chocolate. The below are excerpts from the standards. An excerpt from the European standard Relating to Cocoa and Chocolate Products for white chocolate includes that it is not less than 20% by weight of more cocoa butter, not less than 14% by weight of milk solids, and 3.5% or more milk fat. An excerpt from the Canadian standard for Cocoa and Chocolate Products for white chocolate includes that it is not less than 20% by weight or more cocoa butter, not less than 14% by weight of milk solids, and 3.5% or more milk fat. An excerpt from the Brazilian standard of identity for white chocolate includes that it is not less than 20% by weight of total cocoa butter solids. An excerpt from the Mexican standard of identity for white chocolate includes that it is not less than 20% by weight of cocoa solids, not less than 20% by weight of cocoa butter, not less than 14% by weight of total milk solids, not less than 3.5% by weight of milk fat, and not less than 34% by weight of total cocoa and milk solids.

Cocoa Extract

The chocolate confection of the present invention comprises a white confectionery ingredient, a cocoa extract, and a food acid with enhanced attributes. The cocoa extract provides a variety of benefits including enhancement of the flavor attributes of the chocolate confection of the present invention. As used in the present invention, the cocoa extract does not enhance the undesirable flavor attributes of bitterness and astringency of the chocolate confection. Additionally, the cocoa extract has antioxidant properties and therefore may function to delay the onset of oxidation that typically negatively impacts the flavor attributes and shelf life of the white confectionery ingredient. Accordingly, chocolate confection has an enhanced shelf life over 6 weeks, 12 weeks, 26 weeks, 30 weeks, 34 weeks, or more. As a secondary benefit, the cocoa extract imparts to the chocolate confection a red color.

Any cocoa extract that is particulate may lend itself for use in preparation of the chocolate confection. Cocoa extracts may be prepared by reducing cocoa beans to a powder, defatting the powder, and extracting and purifying the active compound(s) from the defatted powder. Suitable cocoa extracts include those disclosed in U.S. Pat. No. 9,114,114, the entire disclosure of which is incorporated by reference.

The combination of the type, amount, and particle size of the cocoa extract and food acid in the chocolate confection enhances the fruity flavor attributes and modifies the dairy derived flavor attributes of the white confectionery ingredient to provide a chocolate confection with unique organoleptic properties, including, enhanced flavor attributes. In another aspect, the combination of the type, amount and particle size of the cocoa extract and food acid in the chocolate confection provides a product according to the present invention with a significantly different flavor profile compared to standard white, milk or dark chocolate confections. Both the amount of cocoa extract utilized in the chocolate confection and the particle size of the cocoa extract may enhance the fruity flavor attributes and modify the dairy derived flavor attributes of the white confectionery ingredient to provide a chocolate confection with a unique flavor profile. Additionally, the combination of the usage level and the particle size of the cocoa extract allows the white confectionery ingredient's flavors to remain desirable while limiting the bitterness and astringency of the chocolate confection. Additionally, cocoa extract is known to have antioxidant properties and therefore may function to delay the onset of oxidation that typically negatively impacts the flavor attributes and shelf life of the white confectionery ingredient. The chocolate confection has an enhanced shelf life over 6 weeks, 12 weeks, 26 weeks, 30 weeks, 34 weeks, or more. Accordingly the inclusion of the cocoa extract enhances the shelf life of the chocolate confection over 6 weeks, 12 weeks, 26 weeks, 30 weeks, 34 weeks, or more. As a secondary benefit, the cocoa extract imparts a red color to the chocolate confection.

It is known in the art that particle size is an important consideration as it may impacts the texture and flavor attributes of a chocolate confection. It is known in the art that particle size of each ingredient plays a role in the organoleptic properties, as each ingredient produces a different sensation in terms of flavor and mouthfeel. For example, large sugar crystals are less gritty but readily disperse, whereas cocoa particles may give a persistent sensation of roughness, and milk crumb aggregates readily soften and disperse, but may function to overcome sliminess. Challenges in the art with respect to particle size include ascertaining the optimal particle size for the desired flavor and texture attributes, and maintaining a consistent particle size of each ingredient.

In some embodiments of the present invention, the cocoa extract may be milled or reduced to a specific particle size by any method known in the art. A suitable process for milling cocoa extracts is disclosed in U.S. Pat. No. 9,114,114.

It would normally be expected that by reducing the particle size of bitter and astringent compounds, the compound's increased surface area would cause increased levels of bitterness and/or astringency. For example, this is observed with coffee beans. Coffee beans that have been milled have increased bitterness and/or astringency in the resulting coffee brewed, as compared to un-milled coffee beans. Similarly, this increased bitterness and astringency would be expected when cocoa extract parties are reduced in size. Surprisingly and contrary to what one would expect when the cocoa extract is reduced to a certain particle sizes, less impact on bitterness and astringency is observed in the chocolate confection of the present invention.

In some embodiments of the present invention, the cocoa extract has a mean particle size of less than about 30 microns. In other aspects, the cocoa extract has a mean particle size of less than about 20 microns. In other embodiment of the invention, the cocoa extract has a mean particle size of less than about 15 microns. Additionally, in other aspects, the cocoa extract has a mean particle size of less than about 12 microns. Other embodiments include a cocoa extract that has a mean particle size of less than about 10 microns. Furthermore, some embodiments include a cocoa extract that has a mean particle size of less than about 5 microns.

Cocoa extracts generally contain cocoa polyphenols, which are known in the art to have antioxidant activity and may have health benefits. The cocoa polyphenols that may be present in the cocoa extract include the flavan-3-ol monomers catechin and epicatechin. Additional information on cocoa polyphenols in cocoa extract is disclosed in U.S. Pat. No. 9,114,114. Accordingly, given the antioxidant benefits of cocoa extract, the inclusion of cocoa extract in the white confectionery ingredient may function to delay onset of oxidation, thereby resulting in a chocolate confection with an enhanced shelf life over 6 weeks, 12 weeks, 26 weeks, 30 weeks, 34 weeks, or more.

In an embodiment of the invention, the chocolate confection has about 5% of less by weight of the cocoa extract based on the weight of the chocolate confection. In some embodiments of the invention, the chocolate confection has about 3% or less by weight of the cocoa extract based on weight of the chocolate confection. In other embodiments, the chocolate confection has about 1.5% or less by weight of the cocoa extract based on weight of the chocolate confection. In some embodiments, the chocolate confection has about 0.5% or less by weight of the cocoa extract based on weight of the chocolate confection.

Food Acid

Acids or food acids are commonly used in confectioneries to perform various functions, including but not limited to, altering the pH, enhancing sour flavor attributes, impacting the setting of jelly ingredients, or preserving the confection. The inclusion of a food acid in the present chocolate confection comprising the cocoa extract enhances the fruity flavor attribute of the white confectionery ingredient. It is known that white confectionery ingredients present challenges in modifying flavors because it tends to be susceptible to off-flavors which detract or mask desirable flavor attributes. Additionally, given the subtle balance of flavor attributes combined with the susceptibility of off-organoleptic attributes, including, but not limited to, flavors and odors, improving the organoleptic properties of white confectionery ingredients presents a challenge.

In some embodiments of the invention, suitable acids may include any acid suitable for human consumption, including, but not limited to, acetic acid, adipic acid, ascorbic acid, citric acid, fumaric acid, lactic acid, sorbic acid, tartaric acid, phosphoric acid, acid compositions derived from fruit juices or extracts or concentrates, sodium acid phosphate, sodium acid sulfate, gluconic acid, glucono-delta-lactone, or all combinations thereof.

The combination of the type, amount, and particle size of the cocoa extract and food acid in the chocolate confection enhances the fruity flavor attributes and modifies the dairy derived flavor attributes of the white confectionery ingredient to provide a chocolate confection with unique organoleptic properties, including enhanced flavor attributes. In some embodiments, the quantity of the food acid and the size of the particles both may be altered to impact the mouthfeel and the flavor impact of the acid on the chocolate confection. The particle size of the food acid may impact the flavor, texture, and mouthfeel of the chocolate confection, including, but not limited to, creamy, coarse, grainy, pungent, sour, astringency or leaving a feeling of dryness in the mouth. In some instances, it may be desirable to include an acid having a mean particle size of less than about 400 microns to produce a chocolate confection that may be coarse, grainy, pungent and astringent. Whereas, in other instances, it may be desirable to include a food acid has a mean particle size of less than about 30 microns to produce a chocolate confection that may be creamy, and smoother in both flavor and texture.

In certain instances, the acid has a mean particle size of less than about 400 microns. In other instances, the food acid has a mean particle size of less than about 375 microns. Additionally, the food acid has a mean particle size of less than about 375 to 300 microns. In terms of the lower limit, the acid may been refined to reduce its particle size to alter the mouthfeel attribute of texture and the flavor attributes imparted from the food acid. In some embodiments, the food acid has a mean particle size of less than about 30 microns. In some embodiments, the food acid has a mean particle size of less than about 20 microns. In other embodiments, the food acid has a mean particle size of less than about 15 microns. In other instances, the food acid has a mean particle size of less than about 12 microns.

In some embodiments of the invention, the chocolate confection has about 1% of less by weight of the food acid based on the weight of the chocolate confection. In an embodiment of the invention, the chocolate confection has about 0.75% or less by weight of the food acid based on weight of the chocolate confection. The present invention also includes a chocolate confection with about 0.5% or less by weight of the food acid based on weight of the chocolate confection. In certain instances, the chocolate confection has about 0.4% or less by weight of the food acid based on weight of the chocolate confection.

The chocolate confection of the present invention may be formed via a variety of manufacturing processes known to one of ordinary skill in the art. Optionally, in some embodiments, the acid may be added in the form of a solid, such as a powder. Suitable examples of a powder include, but not limited to, citric acid or tartaric acid. In other embodiments, the acid may be added in other forms well known in the art, such as, but not limited to, a liquid, slurry or a paste. The food acid of the present invention may be included in the chocolate confection via a variety of methods known to one of ordinary skill in the art. In some embodiments of the invention, the acid is in the form of an acid batch which is obtained by combining the acid and a portion of the white confectionery ingredient into a paste or slurry. This paste or slurry may then be combined with the extract batch to create an exemplary chocolate confection.

Additives

The chocolate confection of the present invention may optionally contain any other suitable additives and ingredients, including, but not limited to, carbohydrates, sugar substitutes, milk solids, dry ingredients, proteins, fruits (including, but not limited to, apples, apricots, cherries, black currents, dates, figs, prunes, raisins, raspberries, strawberries, grapefruit, lemon, lime, orange, ginger, and yuzu), fruit jams, fruit preserves, fruit pulps, fruit purees, candied fruit, glazed fruit, glacé fruit, and, among others, dried fruits, natural and artificial flavors (including, but not limited to, spices, coffee, salt, and/or brown nut-meats, etc.), vitamins, minerals, antioxidants, release agents, emulsifiers, enzymes, sterols, stanols, and their esters, and L-arginine-containing ingredients such as nut pieces, nut flours, and nut pastes. Suitable nuts include, but not limited to, almond, Brazil nut, cashew, chestnut, coconut, hazel, macadamia, peanut, pecan, pistachio, and walnut.

The chocolate confection of the present invention may be used in any suitable form and shape known to one skilled in the art, including, but not limited to, bars, solid blocks, hollow shells, shells filled with materials (such as, but not limited to, fondant, fudge, and soft caramel), the coating for any foods (including, but not limited to, filled bars, chips, drops, caramel, peanut butter, nougat, fruit, nuts, wafers, oats, ice cream, and combinations hereof), aerated in the form of bars, tablets, foams, mousses, flakes, bark, vermicelli, streusel, dry powders, dusting powders, fondue sauce, or any other forms known in the art.

Process of Forming the Chocolate Confection

The chocolate confection of the present invention may be formed via a variety of manufacturing processes known to one of ordinary skill in the art. Generally, it is known in the art that manufacturing processes involve certain operations, including, but not limited to, preparation of the ingredients, mixing of the ingredients (continuous or batch), optionally refining of the mixture, optionally pasting or partial liquefaction of the refined mixture, optionally conching (or an alternative process), optionally adjusting the viscosity, and among other steps, optionally flavoring.

Figure 1:
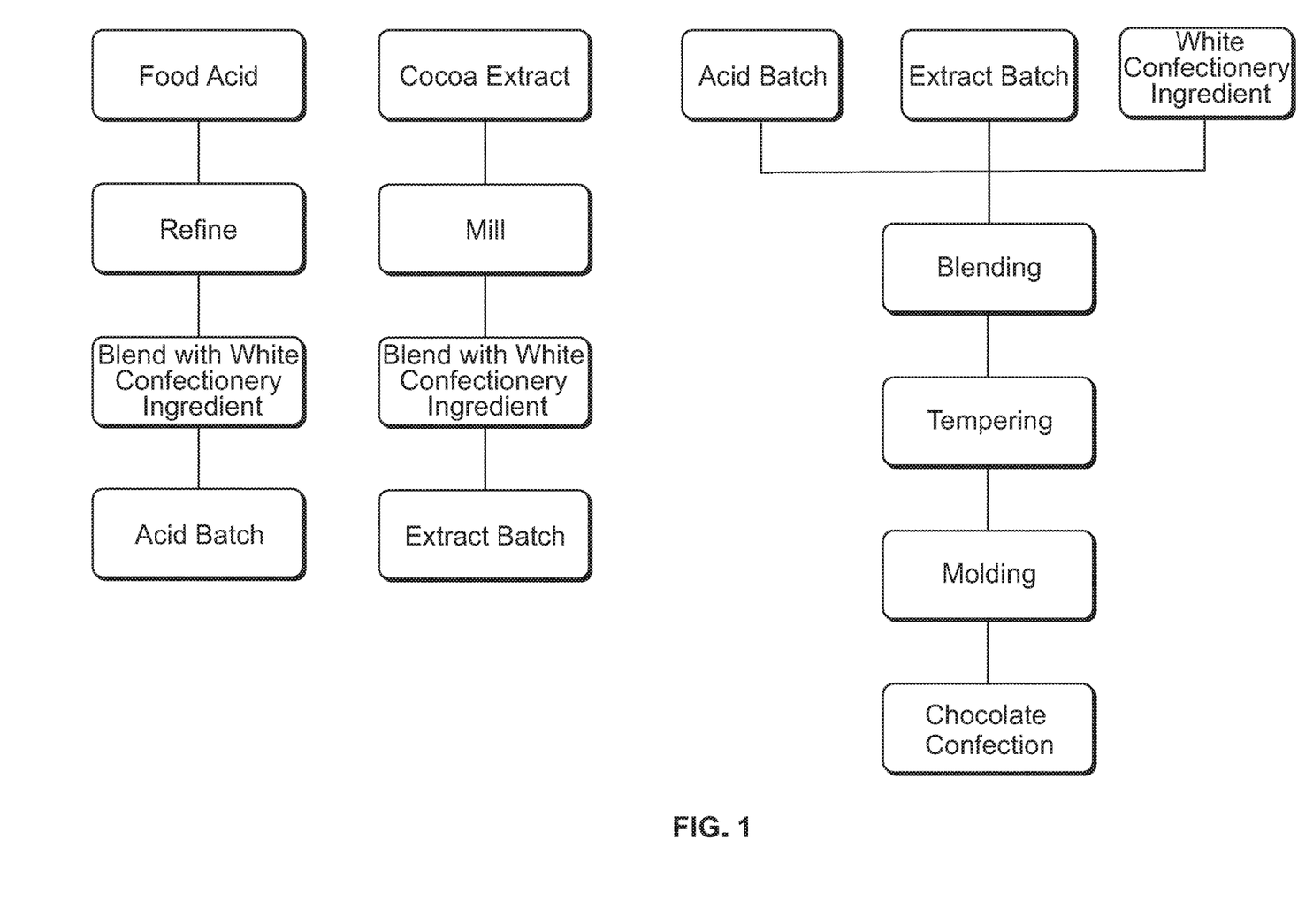
FIG. 1 shows an exemplary process flow chart to produce a chocolate confection.

The present invention is also directed to a process for producing a chocolate confection, comprising the steps provided in the process flow of FIG. 1: providing a food acid; optionally refining the food acid; then blending with first portion of white confectionery ingredient to produce the acid batch; additionally providing a cocoa extract; optionally milling the cocoa extract; then blending with second portion of white confectionery ingredient to produce the extract batch; next combining the acid batch, the extract batch, and optionally a third portion of a white confectionery ingredient, at the desired proportions to deliver the final chocolate confection blend; tempering the blend, molding the tempered blend, and subsequently forming an exemplary chocolate confection of the present invention.

The chocolate confection of the present invention may be used in various methods of manufacturing accordingly to processes known to one of skill in the art, including, but not limited to, chocolate making process, molding, enrobing, panning, and roller depositing.

Particle Size Analysis

Particle size may be measured by any of several techniques known in the art. The mean particle size of a distribution is defined as a mean volume particle diameter over a given distribution, measured using the Coulter® laser light scattering technique. The largest and smallest particle size in a given distribution may be determined by scanning electron microscope (SEM) laser light scattering or the like. The particle size was analyzed by laser light scattering using a Coutler LS230 particle size analyzer (sold by Coulter Corporation, Hialeah, Fla.).

The examples which follow are intended as an illustration of certain embodiments of the invention, and no limitation of the invention is implied.

Preparation of Exemplary Cocoa Extract

Commercially available and/or select un- or under-fermented cocoa beans having an initial moisture content of about 7% to 8% by weight are pre-cleaned. The cleaned beans are then passed through an infra-red heating apparatus. The shells dry rapidly and separate from the cocoa nibs. The broken pieces separated by the vibrating screen are reintroduced into the product stream prior to the winnowing step. The beans are then winnowed to crack the beans, to loosen the shells, and to separate the lighter shells from the nibs while at the same time minimizing the amount of nib lost with the shell reject stream. The resulting cocoa nibs are screw pressed to extract the cocoa butter from the cocoa solids.

A sample of cocoa solids produced according to the above-described process as disclosed in U.S. Pat. No. 9,114,114 from unfermented cocoa beans (fermentation factor 233), when analyzed according to the Adamson et al. method discussed above, typically will have a total cocoa procyanidin content of about 50 to about 75, preferably about 60 to about 75, or more preferably about 75 to about 80 milligrams of total cocoa polyphenols based on gram of defatted cocoa solids.

The defatted cocoa solids are contacted with an aqueous organic solvent. The solvent was about 75% ethanol/25% water (v/v) or about 80% acetone/20% water (v/v). The micella is separated from the cocoa residue and concentrated. The concentrated extract is then spray-dried. The spray-dried cocoa extracts are milled using an air jet mill, resulting in a milled cocoa extract.

Preparation of Exemplary Extract Batches

Exemplary extract batches (EB) are formulated using white chocolate as the white confectionery ingredient, and cocoa extract of differing particle sizes. Table 1 below provides exemplary mean particle sizes of the cocoa extracts.

TABLE 1

Exemplary Mean Particle Sizes of Cocoa Extract

|  | Cocoa Extract # 1 (microns) | Cocoa Extract # 2 (microns) |
|---|---|---|
| Mean Particle Size | 3 | 30 |
| Particle Size, d (0.5) | 2 | 30 |
| Particle Size, d (0.9) | 5 | 49 |

Table 2 below provides exemplary Extract Batches formulations in percent by weight of each ingredient based on weight of the chocolate confection.

TABLE 2

Exemplary Extract Batch (EB) Formulations

|  | Cocoa Extract # 1 (Weight %) | Cocoa Extract # 2 (Weight %) | White Chocolate (Weight %) |
|---|---|---|---|
| EB 1 | 0.25 | 0 | 99.75 |
| EB 2 | 0.39 | 0 | 99.6 |
| EB 3 | 0.50 | 0 | 99.5 |
| EB 4 | 0 | 0.40 | 99.6 |
| EB 5 | 3 | 0 | 97.0 |
| EB 6 | 0 | 0.5 | 99.5 |
| EB 7 | 0 | 5.0 | 95.0 |

Preparation of Exemplary Acid Batches

Exemplary acid batches (AB) are formulated using white chocolate as the white confectionery ingredient, and using citric acid as the food acid in differing particle sizes. Table 3 below provides exemplary mean particle sizes of the food acids.

TABLE 3

Exemplary Mean Particle Sizes of Food Acids

|  | Mean Particle Size microns |
|---|---|
| Acid 1 | 10.6 |
| Acid 2 | 12 |
| Acid 3 | 30 |
| Acid 4 | 400 |
| Acid 5 | 300 |

TABLE 4 below provides exemplary Acid Batches (AB) formulations in percent by weight of each ingredient based on weight of the chocolate confection.

| Exemplary Acid Batch (AB) Formulations | Acid 1 | Acid 2 | Acid 3 | Acid 4 | Acid 5 | White Chocolate | Fat Content (%) |
|---|---|---|---|---|---|---|---|
| AB 1 | 20.0 | 0 | 0 | 0 | 0 | 80.0 | 26.40 |
| AB 2 | 0 | 20.0 | 0 | 0 | 0 | 80.0 | 26.40 |
| AB 3 | 0 | 0 | 20.0 | 0 | 0 | 80.0 | 26.40 |
| AB 4 | 0 | 0 | 0 | 20.0 | 0 | 80.0 | 26.40 |
| AB 5 | 0 | 0 | 0 | 0 | 20.0 | 80.0 | 26.40 |

Preparation of Exemplary Chocolate Confections

A process for producing a chocolate confection includes, but not limited to, blending an Extract Batch along with an Acid Batch, tempering the blend, and molding the tempered blend.

Tables 5 and 6 below demonstrate exemplary chocolate confections comprising the variations in the quantity of the white confectionery ingredient, and variations in the quantity and particle sizes of both the cocoa extract and the food acid. Tables 5 and 6 below provides exemplary chocolate confectionery formulations in percent by weight of each ingredient based on weight of the chocolate confection.

TABLE 5

Formulations of Exemplary Chocolate Confections

| Example | EB 1 | EB 2 | EB 3 | EB 4 | AB 1 | AB 2 | AB 3 |
|---|---|---|---|---|---|---|---|
| Ex. A | 0 | 98.5 | 0 | 0 | 1.5 | 0 | 0 |
| Ex. B | 0 | 98.0 | 0 | 0 | 2.0 | 0 | 0 |
| Ex. C | 0 | 97.5 | 0 | 0 | 2.5 | 0 | 0 |
| Ex. D | 0 | 0 | 98.0 | 0 | 2.0 | 0 | 0 |
| Ex. E | 0 | 0 | 98.0 | 0 | 0 | 2.0 | 0 |
| Ex. F | 98.0 | 0 | 0 | 0 | 2.0 | 0 | 0 |
| Ex. G | 0 | 98.0 | 0 | 0 | 2.0 | 0 | 0 |
| Ex. H | 0 | 0 | 0 | 98.0 | 2.0 | 0 | 0 |
| Ex. I | 96.25 | 0 | 0 | 0 | 0 | 0 | 3.75 |

TABLE 6

Formulations of Exemplary Chocolate Confections

| Example | EB 2 | EB 5 | EB 6 | EB 7 | AB 1 | AB 2 | AB 3 | AB 4 | AB 5 |
|---|---|---|---|---|---|---|---|---|---|
| Ex. J | 0 | 98 | 0 | 0 | 0 | 0 | 2.0 | 0 | 0 |
| Ex. K | 0 | 0 | 98 | 0 | 0 | 2.0 | 0 | 0 | 0 |
| Ex. L | 0 | 0 | 0 | 98 | 2.0 | 0 | 0 | 0 | 0 |
| Ex. M | 0 | 0 | 0 | 95 | 0 | 0 | 0 | 0 | 5 |
| Ex. N | 0 | 0 | 0 | 99.8 | 0 | 0 | 0 | 0 | 0.2 |

The EB is dispersed into the AB at standard conditions known to one of skill in the art. The chocolate confection is tempered and molded into solid chocolate bars. The chocolate confection of the present invention may be formed via a variety of manufacturing processes known to one of ordinary skill in the art.

Further examples of products made according to the present invention include a chocolate confection: Example W comprising 0.39 wt % Cocoa Extract and 0.40 wt % of Citric Acid based on the weight of the chocolate confection, Example X comprising 0.39 wt % Cocoa Extract and 0.00 wt % of Citric Acid based on weight of the chocolate confection; Example Y comprising 0.78 wt % Cocoa Extract and 0.00 wt % of Citric Acid based on weight of the chocolate confection and Example Z comprising 0.00 wt % Cocoa and 0.40 wt % of Citric Acid based on weight of the chocolate confection.

Sensory Testing

Descriptive sensory analysis of the chocolate confections of Example A, Example B, Example C, dark chocolate, milk chocolate, and white chocolate was conducted. All samples were evaluated by internal sensory taste testers to evaluate the intensities of different flavors attributes of a given sample. Table 7 provides exemplary intensities of the flavor attributes of each sample as observed. In Table 7, within each flavor attribute, the different superscript letters represent statistically significant differences at 95% confidence.

TABLE 7

Exemplarity Intensity of Flavor Attributes via Sensory Testing

| Sample | Dairy Derived Attributes | Chocolate Essence | Sweet | Fruity | Sour | Bitter |
|---|---|---|---|---|---|---|
| Milk Chocolate | $3.4^b$ | $2.9^b$ | $3.6^{ab}$ | $1.2^b$ | $1.2^b$ | $1.1^a$ |
| Dark Chocolate | $1.0^c$ | $4.8^a$ | $2.3^b$ | $2.9^a$ | $1.7^b$ | $2.3^a$ |
| White Chocolate | $4.7^a$ | $1.1^c$ | $4.4^a$ | $1.7^b$ | $1.3^b$ | $1.1^a$ |
| Example A | $3.4^b$ | $1.0^c$ | $4.1^a$ | $3.4^a$ | $3.6^a$ | $1.4^a$ |
| Example B | $3.2^b$ | $1.0^c$ | $4.0^a$ | $3.7^a$ | $3.7^a$ | $1.4^a$ |
| Example C | $2.7^b$ | $1.0^c$ | $3.4^b$ | $3.8^a$ | $4.2^a$ | $1.6^a$ |

Average Intensity of Flavor Attribute (1-5, low to high) (n = 9)

Figure 3:
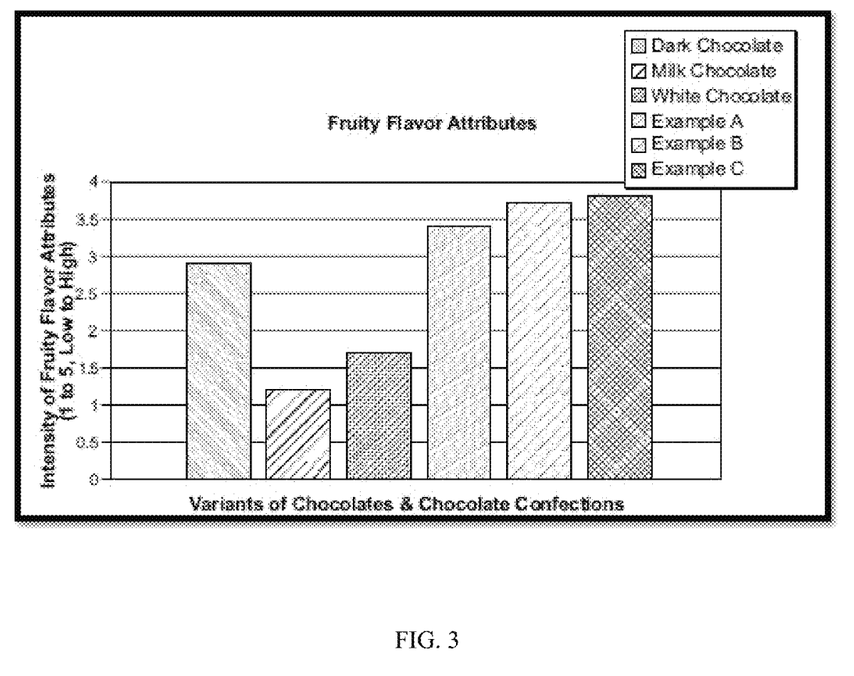
FIG. 3 shows a Chart B which illustrates Intensity of Fruity Flavour attributes of exemplary chocolate confections of the present disclosure.

For example, as shown in the aforementioned Chart B in the present application, the data in Table 7 shows that there is a 95% confidence that Example A, Example B and Example C all have statistically significantly more fruity flavor attributes than the tested white chocolate.

Figure 5:
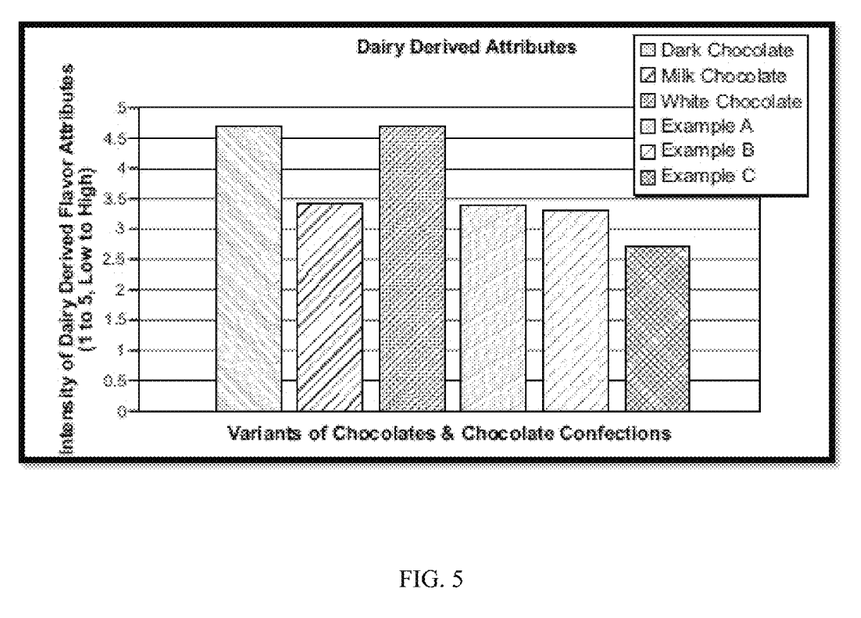
FIG. 5 shows a Chart D which illustrates Intensity of Dairy Derived Flavour attributes of exemplary chocolate confections of the present disclosure.

As another example, as shown in the aforementioned Chart D in the present application, the data in Table 7 shows that there is 95% confidence that Examples A, B, and C have statistically significantly less dairy derived flavor attributes than the tested white chocolate.

Descriptive sensory analysis of the chocolate confections of Example W, Example X, Example Y, Example Z, standard dark, milk and white chocolates was conducted. All samples were evaluated using the Descriptive Attributes evaluation and Discrimination testing as aforementioned in the present application and by trained sensory taste testers to evaluate the intensities of different flavors attributes of a given sample. Table 8 provides mean scores of the average exemplary intensities of the flavor attributes of each sample as observed. In Table 8, within each flavor attribute, the different superscript letters represent statistically significant differences at 95% confidence.

TABLE 8

Intensity of Flavor Attributes via Descriptive Analysis attributes Sensory Testing Mean scores-Average Intensity of Flavor Attributes

| | White chocolate | Milk chocolate | Dark chocolate | Example W | Example X | Example Y | Example Z |
|---|---|---|---|---|---|---|---|
| Chocolate essence | $0.04^c$ | $4.24^b$ | $5.96^a$ | $0.00^c$ | $0.00^c$ | $0.17^c$ | $0.00^c$ |
| Cooked Milk | $3.43^{ab}$ | $3.72^a$ | $0.00^e$ | $2.33^d$ | $3.02^{bc}$ | $3.26^{ab}$ | $2.52^{cd}$ |
| Nonfat dried milk | $0.54^a$ | $0.37^{abc}$ | $0.00^c$ | $0.11^{bc}$ | $0.61^a$ | $0.52^{ab}$ | $0.00^c$ |
| Vanilla | $3.28^a$ | $2.02^c$ | $1.89^c$ | $1.87^c$ | $2.54^b$ | $2.46^b$ | $2.22^{bc}$ |
| Vanillin | $2.57^a$ | $0.00^d$ | $0.00^c$ | $1.02^c$ | $1.87^{ab}$ | $1.78^b$ | $1.74^b$ |
| Caramel essence | $3.07^b$ | $4.22^a$ | $2.13^d$ | $2.28^d$ | $2.67^c$ | $2.72^{bc}$ | $2.41^{cd}$ |
| Fruity complex | $0.00^b$ | $0.00^b$ | $1.50^a$ | $1.20^a$ | $0.13^b$ | $0.22^b$ | $1.20^a$ |
| Citrus | $0.00^b$ | $0.00^b$ | $0.17^b$ | $1.20^a$ | $0.13^b$ | $0.22^b$ | $1.20^a$ |
| Cultured dairy | $0.00^b$ | $0.00^b$ | $0.00^b$ | $1.87^a$ | $0.26^b$ | $0.00^b$ | $1.76^a$ |
| Sweet | $11.83^a$ | $11.20^b$ | $9.80^c$ | $10.98^b$ | $11.28^b$ | $11.35^b$ | $11.04^b$ |
| Sour | $1.22^{cd}$ | $1.20^d$ | $1.83^{bc}$ | $4.67^a$ | $2.24^b$ | $2.02^b$ | $5.07^a$ |

The data in Table 8 shows flavor and basic taste differences between products of the present invention, Examples W, X, Y, Z and standard white, milk and dark chocolate confections, in particular for cooked milk, nonfat dry milk, vanilla, fruity complex, citrus, cultured dairy, sweet and sour. For example, advantageously the products of the present invention have enhanced fruity flavor attribute in comparison to milk and white chocolate products. Moreover, the products of the present invention Examples W, X, Y, and Z have a modified dairy derived flavour attributes when compared with standard white, milk and dark chocolate confections. Furthermore, the products of the present invention have comparable fruity flavor attributes to dark chocolate without having any detrimental impact on organoleptic properties.

Furthermore, the products of the present invention, such as examples W, X, Y and Z, differ significantly in key flavor attributes and basic tastes when compared to the standard white, milk and dark chocolate products.

Discrimination testing of the chocolate confections of Example W, Example X, Example Y, and Example Z, compared against standard white chocolates was conducted. The preferred products of the present invention such as examples W, Y and Z were found to fail discrimination testing for similarity indicating the products of the present invention to be distinguishable from white chocolate holistically in relation to key flavor attributes such as overall flavor, chocolate flavor, sourness, dairy/milk and sweetness.

Other variations and modifications of this invention will be obvious to those skilled in this art. This invention is not to be limited except as set forth in the following claims.

What is claimed is:

1. A chocolate confection comprising:
   a white confectionery ingredient comprising white chocolate, white compound coating, or a combination thereof;

about 5% or less by weight of a cocoa extract; and
from about 0.1% to about 1% by weight of a food acid powder;
wherein the cocoa extract has a mean particle size of less than about 30 microns, wherein the food acid powder has a mean particle size of less than about 400 microns that provides the chocolate confection with astringency, and wherein fruity flavor attributes of the white confectionery ingredient are enhanced to provide the chocolate confection with intense fruity flavor attributes in the absence of dried fruits.

2. The chocolate confection of claim 1, comprising about 3% or less by weight of the cocoa extract.

3. The chocolate confection of claim 2, comprising about 1.5% or less by weight of the cocoa extract.

4. The chocolate confection of claim 3, comprising about 0.5% or less by weight of the cocoa extract.

5. The chocolate confection of claim 1, wherein the cocoa extract has a mean particle size of less than about 20 microns.

6. The chocolate confection of claim 5, wherein the cocoa extract has a mean particle size of less than about 15 microns.

7. The chocolate confection of claim 6, wherein the cocoa extract has a mean particle size of less than about 12 microns.

8. The chocolate confection of claim 7, wherein the cocoa extract has a mean particle size of less than about 10 microns.

9. The chocolate confection of claim 8, wherein the cocoa extract has a mean particle size of less than about 5 microns.

10. The chocolate confection of claim 1, comprising from about 0.1% to about 0.75% by weight of the food acid powder.

11. The chocolate confection of claim 10, comprising from about 0.3% to about 0.5% by weight of the food acid powder.

12. The chocolate confection of claim 11, comprising about 0.4% by weight of the food acid powder.

13. The chocolate confection of claim 1, wherein the food acid powder has a mean particle size of about 30 microns.

14. The chocolate confection of claim 1, wherein the cocoa extract and the food acid powder enhance the fruity flavor attributes of the white confectionery ingredient.

15. The chocolate confection of claim 1, wherein the chocolate confection has statistically significantly more intense fruity flavor attributes compared to fruity flavor attributes of a conventional chocolate confection.

16. The chocolate confection of claim 1, wherein the chocolate confection has statistically significantly more intense fruity flavor attributes, at 95% confidence, compared to fruity flavor attributes of a conventional chocolate confection.

17. The chocolate confection of claim 1, wherein the chocolate confection has a less intense dairy derived flavor attributes compared to dairy derived flavor attributes of a conventional chocolate confection.

18. The chocolate confection of claim 1, wherein the chocolate confection has statistically significantly less intense dairy derived flavor attributes compared to dairy derived flavor attributes of a conventional chocolate confection.

19. The chocolate confection of claim 1, wherein the chocolate confection has statistically significantly less intense dairy derived flavor attributes, at 95% confidence, compared to dairy derived flavor attributes of a conventional chocolate confection.

20. The chocolate confection of claim 1, wherein the cocoa extract delays onset of oxidation of the white confectionery ingredient to provide the chocolate confection with an enhanced shelf life over 6 weeks, 12 weeks, 26 weeks, 30 weeks, 34 weeks, or more.

21. The chocolate confection of claim 1, wherein the confection has a Hunter L* value in the range of about 15 to about 70.

22. The chocolate confection of claim 21, wherein the confection has a Hunter a* value in the range of about 1 to about 40.

23. The chocolate confection of claim 21, wherein the confection has a Hunter b* value in the range of about 0.5 to about 20.

24. The chocolate confection of claim 22, wherein the confection has a Hunter b* value in the range of about 0.5 to about 20.

25. The chocolate confection of claim 1, wherein the food acid powder is selected from the group consisting of acetic acid, adipic acid, ascorbic acid, citric acid, fumaric acid, lactic acid, sorbic acid, tartaric acid, phosphoric acid, sodium acid phosphate, sodium acid sulfate, gluconic acid, glucono-delta-lactone, and combinations thereof.

26. A process for producing a chocolate confection, comprising the steps of: (i) providing a cocoa extract; (ii) providing a white confectionery ingredient comprising white chocolate, white compound coating, or a combination thereof; (iii) providing a food acid in solid form; (iv) combining the cocoa extract and a first portion of the white confectionery ingredient to obtain an extract batch; (v) combining the food acid in solid form and a second portion of the white confectionery ingredient different from the first portion of the white confectionery ingredient to obtain an acid batch; (vi) combining at least 95% by weight of the extract batch, at least 0.2% by weight of the acid batch, and optionally a third portion of the white confectionery ingredient to obtain a chocolate confection; wherein the food acid in solid form has a mean particle size of less than about 400 microns that provides the chocolate confection with astringency; and wherein the process is free from adding fruit ingredients.

27. The process of claim 26, wherein the combined extract batch, the acid batch, and optional third portion of the white confectionery ingredient are heated and cooled to temper the chocolate confection.

28. The process of claim 26, wherein the combined extract batch, the acid batch, and optional third portion of the white confectionery ingredient are molded to obtain a chocolate confection.

29. The chocolate confection of claim 1, wherein the food acid powder has a mean particle size less than about 375 to 300 microns less than about 375 microns to 300 microns.

* * * * *